United States Patent
Son et al.

(10) Patent No.: US 9,427,918 B2
(45) Date of Patent: Aug. 30, 2016

(54) COLOR SEALANT COMPOSITION WITH SELF-SEALING PERFORMANCE FOR A TIRE

(71) Applicant: KUMHO TIRE CO., INC., Gwangju (KR)

(72) Inventors: Yeon-Song Son, Gwangju (KR); Heung-Goo Lee, Seoul (KR)

(73) Assignee: Kumho Tire Co., Gwangju (KR)

( * ) Notice: Subject to any disclaimer, the term of this patent is extended or adjusted under 35 U.S.C. 154(b) by 104 days.

(21) Appl. No.: 14/262,476

(22) Filed: Apr. 25, 2014

(65) Prior Publication Data
US 2014/0323645 A1    Oct. 30, 2014

(30) Foreign Application Priority Data

Apr. 26, 2013    (KR) .................. 10-2013-0046720

(51) Int. Cl.
| | |
|---|---|
| *B29C 73/16* | (2006.01) |
| *B60C 1/00* | (2006.01) |
| *C08L 7/00* | (2006.01) |
| *C08L 23/22* | (2006.01) |
| *C08K 3/36* | (2006.01) |
| *C08K 5/14* | (2006.01) |
| *B29L 30/00* | (2006.01) |
| *C08K 5/00* | (2006.01) |
| *C08K 9/02* | (2006.01) |

(52) U.S. Cl.
CPC ............ *B29C 73/163* (2013.01); *B60C 1/0008* (2013.04); *C08L 7/00* (2013.01); *C08L 23/22* (2013.01); *B29L 2030/00* (2013.01); *B29L 2030/008* (2013.01); *C08K 3/36* (2013.01); *C08K 5/0041* (2013.01); *C08K 5/14* (2013.01); *C08K 9/02* (2013.01)

(58) Field of Classification Search
CPC ........................ B29C 73/163; B60C 1/0008
USPC .................................... 524/525, 493
See application file for complete search history.

(56) References Cited

U.S. PATENT DOCUMENTS

| | | | |
|---|---|---|---|
| 4,539,344 A * | 9/1985 | Van Ornum | B29C 73/163 152/502 |
| 2004/0194862 A1 | 10/2004 | Fukutomi et al. | |
| 2005/0113502 A1* | 5/2005 | Fitzharris Wall | B29C 73/163 524/425 |
| 2007/0203260 A1 | 8/2007 | Okamatsu | |
| 2011/0126953 A1 | 6/2011 | Incavo | |

FOREIGN PATENT DOCUMENTS

| | | |
|---|---|---|
| JP | 2007-224245 A | 9/2007 |
| KR | 10-2004-0044476 A | 5/2004 |
| KR | 10-2010-0041368 A | 4/2010 |
| KR | 10-2011-0063354 A | 6/2011 |
| KR | 10-2012-0038235 A | 11/2012 |
| WO | WO 03/101709 A1 | 12/2003 |

OTHER PUBLICATIONS

NPL1 English abstract of KR 10-2012-0038235 A, as captured from KIPO website on Oct. 23, 2014.
NPL2 English abstract of KR 10-2010-0041368 A, as captured from KIPO website on Oct. 23, 2014.

* cited by examiner

*Primary Examiner* — Ling Choi
*Assistant Examiner* — Ronald Grinsted
(74) *Attorney, Agent, or Firm* — Medler Ferro Woodhouse & Mills

(57) ABSTRACT

Disclosed is a color sealant composition with self-sealing performance useful for a tire. More specifically, disclosed are a color sealant composition with self-sealing performance useful for a tire which includes 10 to 60 wt. parts of surface modified silica, 0.05 to 5 wt. parts of pigment, 40 to 100 wt. parts of polybutene having a number average molecular weight of 1,000 to 1,500, 60 to 300 wt. parts of polybutene having a number average molecular weight of 2,000 to 3,000, and 5 to 15 wt. parts of peroxide, to 100 wt. parts of raw rubber, and a tire including the color sealant composition.

4 Claims, No Drawings

COLOR SEALANT COMPOSITION WITH SELF-SEALING PERFORMANCE FOR A TIRE

This application claims priority to Korean Patent Application No. 10-2013-0046720, filed on Apr. 26, 2013 in the Korean Intellectual Property Office, the entire disclosure of which is incorporated herein by reference.

FIELD OF THE INVENTION

The present invention relates to annular intravaginal devices comprising an aperture, methods of making, and uses thereof. The annular intravaginal devices comprise an aperture extending into the device, the aperture having: (a) an interior diameter, and (b) an exterior entry diameter, wherein the exterior entry diameter of the aperture is less than the interior diameter of the aperture. In particular, the present invention relates to a color sealant composition with self-sealing performance useful for tires, characterized in that a color sealant with different colors from a tire outflows due to pneumatic pressure when a hole is made in the tire (that is, the tire becomes flat), to exert self-sealing effects and thus prevent the pneumatic pressure in a tire ('tire pressure') from being decreased and retain a desired level. Furthermore, since the sealant with different colors from the tire is provided on the tire, it is possible to ensure that a consumer will see the need to replace the tire, thereby providing assistance in safe running.

BACKGROUND OF THE INVENTION

Serious pneumatic air leakage may occur if a tire is flat during driving. Among technical solutions to prevent such an accident as described above, a run-flat tire in a sidewall reinforcement manner, a sealant tire with instant hole sealing performance wherein a flowable material is provided inside the tire, or the like, have been disclosed.

For the sidewall reinforcement manner, introducing an insert material into the sidewall can allow driving even though the tire pressure is empty. However, it has a defect that the weight of tire is necessarily increased. In addition, since the sidewall part has higher stiffness, running stability may be reduced. Furthermore, in case where the tire is damaged by a sharp object such as a nail, a high pressure is applied to the tire during high-speed driving and, at the same time, the tire changes into a more elastic state and the foregoing object may easily become detached from the tire. As a result, the tire pressure is rapidly reduced causing the driver difficulties in operating a vehicle or throwing the vehicle off balance, hence seriously influencing the safety of the driver.

Meanwhile, a sealant tire technique is to coat an inner side of the tire with a sealant material so that, when a hole is opened in the tire, the sealant material outflows from the hole portion by a tire pressure and exerts instant self-sealing effects, simultaneously, thereby filling the hole portion of the tire and maintaining a desired tire pressure. However, since the sealant material used in the sealant technique generally has the same color as that of the tire, the consumer may not recognize an opening in the tire or forget it's occurrence and therefore neglect replacing the flat tire, hence often causing a negative influence upon driver safety.

Meanwhile, among prior arts related to the present invention, Korean Patent Laid-Open Publication No. 2004-0044476 discloses a sealant layer provided in an area corresponding to at least a tread part in a tire. Such sealant layer may include an adhesive sealant prepared by heating a rubber composition which includes 0.2 to 20 wt. parts of peroxide admixed to 100 wt. parts of a rubber component containing at least 50 wt. % of polyisobutylene. There is a disclosure that describes an air tire fabricated by adding, as an adhesive contained in the sealant layer, 5 to 50 wt. parts of liquid ethylene, α-olefin copolymer, liquid polybutadiene or liquid polyisoprene, a method for fabrication of the foregoing tire, and a rubber composition for sealant.

Further, Korean Patent Laid-Open Publication No. 2010-0041368 discloses a sealant composition for an automobile tire, which includes 20 to 60 wt. parts of a sealing agent, 20 to 40 wt. parts of an anti-freezing agent, 0.5 to 8 wt. parts of an adhesive agent, 10 to 35 wt. parts of solid content and 2 to 10 wt. parts of deionized water, thus exhibiting excellent sealing effects when applied to a flat tire.

However, the present invention involves different technical features, compared to the foregoing prior arts, therefore, has inventive configurations clearly distinguished from those of the foregoing prior arts.

BRIEF SUMMARY OF THE INVENTION

The present invention is directed to a color sealant composition for a tire, comprising: to 100 wt. parts of raw rubber, 10 to 60 wt. parts of surface modified silica, 0.05 to 5 wt. parts of pigment, 40 to 100 wt. parts of polybutene having a number average molecular weight of 1,000 to 1,500, 60 to 300 wt. parts of polybutene having a number average molecular weight of 2,000 to 3,000, and 5 to 15 wt. parts of peroxide, so as to have self-sealing performance.

In some embodiments, the raw rubber is at least one selected from natural rubber and butyl rubber, and the surface modified silica is one prepared by reacting silica at 300 to 500° C. for 30 minutes to 3 hours, or one prepared by adding silica to a nitric acid solution having a concentration of 2 to 4 M at 110 to 120° C., reacting the same for 3 to 7 hours, washing, and drying the reaction product at 80 to 100° C. for 30 minutes to 2 hours.

In some embodiments, the invention is directed to a tire comprising the color sealant composition for a tire as described herein.

In some embodiments, the invention is directed to a tire comprising the color sealant composition for a tire as described herein, wherein the composition is applied inside an inner liner of the tire.

Under such circumstances as described above, the present inventors have found that the provision of a color sealant composition with self-sealing performance for a tire as one of the sealant tire techniques may achieve advantages such that: when a tire including the color sealant composition for a tire according to the present invention becomes flat, a color sealant with different colors from the tire outflows due to pneumatic pressure and exerts self-sealing effects to prevent a tire pressure from being decreased and retain a desired level; and the color sealant with different colors from the tire is formed on the tire so as to ensure that a consumer will see the need to replace the tire, thus improving driver safety. As a result, the present invention has been completed.

Accordingly, it is an object of the present invention to provide a color sealant composition with self-sealing performance for a tire.

Another object of the present invention to provide a tire including the color sealant composition with self-sealing performance for a tire.

In order to accomplish the foregoing objects, according to an aspect of the present invention, there is provided a color sealant composition for a tire, including: 10 to 60 wt. parts of surface modified silica, 0.05 to 5 wt. parts of pigment, 40 to 100 wt. parts of polybutene having a number average molecular weight of 1,000 to 1,500, 60 to 300 wt. parts of polybutene having a number average molecular weight of 2,000 to 3,000, and 5 to 15 wt. parts of peroxide, to 100 wt. parts of raw rubber, so as to have self-sealing performance.

With regard to the color sealant composition with self-sealing performance for a tire according to the present invention, a color sealant with different colors from a tire outflows due to pneumatic pressure when the tire becomes flat, to exert self-sealing effects and thus prevent a tire pressure from being decreased and retain a desired level. Furthermore, since the sealant with different colors from the tire is provided on the tire, it can ensure that a consumer will see the need to replace the tire, thus improving driver safety.

DETAILED DESCRIPTION OF THE INVENTION

The present invention discloses a color sealant composition with self-sealing performance for a tire.

More specifically, the present invention discloses a color sealant composition for a tire which includes 10 to 60 wt. parts of surface modified silica, 0.05 to 5 wt. parts of pigment, 40 to 100 wt. parts of polybutene having a number average molecular weight of 1,000 to 1,500, 60 to 300 wt. parts of polybutene having a number average molecular weight of 2,000 to 3,000, and 5 to 15 wt. parts of peroxide, to 100 wt. parts of raw rubber, so as to have self-sealing performance.

Herein, the raw rubber may be at least one selected from natural rubber and butyl rubber, and butyl rubber having an excellent resistance to air permeability may be preferably used.

In addition, surface modified silica is combined with peroxide used as a cross-linking agent in the sealant composition of the present invention, thus being used for improving reinforcing properties of the sealant composition.

The surface modified silica may be used for the inventive sealant composition in an amount of 10 to 60 wt. parts to 100 wt. parts of raw rubber.

The surface modified silica may be included in an amount of 10 to 60 wt. parts to 100 wt. parts of raw rubber. If the amount of surface modified silica used herein is less than 10 wt. parts, improvement in reinforcing properties of the sealant composition is not significant. On the other hand, when the amount of the surface modified silica used herein exceeds 60 wt. parts, improvement in reinforcing properties of the sealant composition is not significant and may actually cause a reduction in physical properties of the composition. Accordingly, the surface modified silica in a master batch may be used in an amount of 10 to 60 wt. parts to 100 wt. parts of raw rubber.

The surface modified silica used herein may be prepared by reacting silica at 300 to 500° C. for 30 minutes to 3 hours.

Preferably, the surface modified silica used herein is prepared by reacting silica at 400° C. for 1.5 hours.

The surface modified silica used herein may be prepared by adding silica to a nitric acid solution with a concentration of 2 to 4 M at 100 to 120° C., reacting the same for 3 to 7 hours, washing, and drying at 80 to 100° C. for 30 minutes to 2 hours.

Preferably, the surface modified silica used herein is prepared by adding silica to a nitric acid solution with a concentration of 3 M at 115° C., reacting the same for 5 hours, washing, and drying at 100° C. for 1 hour.

The surface modified silica used herein may include surface modified silica prepared by oxidizing typical silica generally used as a reinforcing agent in a tire rubber composition in the art. For instance, the silica having a BET surface area of 90 to 250 $m^2/g$, and preferably, 100 to 200 $m^2/g$, may be used.

Pigment included in the color sealant composition with self-sealing performance for a tire according to the present invention exhibits a color and functions to ensure that a driver will see the need to replace the tire.

Compared to tires generally having a black color, the pigment may have a color in contrast to black so as to clearly distinguish the pigment from the tire. Such pigment used herein may include any one selected from, for example, yellow pigment, red pigment, white pigment, blue pigment and bright green pigment.

The pigment may be included in an amount of 0.05 to 10 wt. parts to 100 wt. parts of raw rubber. If a content of the pigment used herein is less than 0.05 wt. parts, effects of the pigment are not significant. On the other hand, when a content of the pigment used herein exceeds 10 wt. parts, mechanical properties like tensile strength is decreased. Therefore, the pigment is preferably included an amount of 0.05 to 10 wt. parts to 100 wt. parts of raw rubber, with regard to the color sealant composition with self-sealing performance for a tire according to the present invention.

The color sealant composition with self-sealing performance for a tire according to the present invention may include at least one of polybutenes having different molecular weights in order to ensure self-sealing performance, that is, a sealing function of the sealant composition.

Polybutene used herein may include 40 to 100 wt. parts of polybutene having a number average molecular weight of 1,000 to 1,500, as well as 60 to 300 wt. parts of the other polybutene having a number average molecular weight of 2,000 to 3,000, to 100 wt. parts of raw rubber.

As a result of using polybutenes with different molecular weights and contents, it was found that, if using both of 40 to 100 wt. parts of polybutene having a number average molecular weight of 1,000 to 1,500 and 60 to 300 wt. parts of polybutene having a number average molecular weight of 2,000 to 3,000 to 100 wt. parts of raw rubber, desired adhesiveness and workability of the color sealant composition with self-sealing performance for a tire can be ensured. Therefore, the polybutenes described in the present invention are preferably used under the aforementioned conditions.

The color sealant composition with self-sealing performance for a tire according to the present invention may further include a cross-linking agent to prevent deformation at a high temperature, wherein the cross-linking agent may be peroxide.

Peroxide may be used in an amount of 5 to 15 wt. parts to 100 wt. parts of raw rubber. If a content of peroxide is less than 5 wt. parts, effects of using peroxide are not significant. On the other hand, when a content of peroxide exceeds 15 wt. parts, improvement in effects is not significant. Therefore, peroxide is preferably used in an amount of 5 to 15 wt. parts to 100 wt. parts of raw rubber.

The peroxide used herein may be peroxide at a purity of 30 to 60%, and preferably, peroxide at a purity of 40%. In case of peroxide at a higher purity, it quickly reacts during preparation of the sealant composition causing a difficulty in controlling the reaction of preparing the sealant composition. If using peroxide at a lower purity, the reaction slowly proceeds during preparation of the sealant composition. Therefore, peroxide at a purity of 30 to 60% is preferably used.

The peroxide described above may include, for example, any one selected from dicumyl peroxide (DCP), t-butyl cumyl peroxide and di-t-butyl peroxide, which have a purity of 30 to 60%.

Other than the foregoing components such as the raw rubber, surface modified silica, pigment, polybutene, and peroxide, the color sealant composition with self-sealing performance for a tire according to the present invention may further include additional components, for example, a homogenizer such as aromatic hydrocarbon resin, an adhesive such as phenolic resin, an anti-aging agent such as N-(1,3-dimethylbutyl)-N'-phenyl-p-phenylenediamine (Kumanox 13), process oil, or the like.

The homogenizer, adhesive, anti-aging agent, and process oil described above, respectively, may be included in amounts of, for example: 5 to 40 wt. parts for the homogenizer; 1 to 20 wt. parts for the adhesive; 0.1 to 5 wt. parts for the anti-aging agent; and 5 to 40 wt. parts of process oil, to 100 wt. parts of raw rubber. However, the homogenizer, adhesive, anti-aging agent and process oil components and contents thereof can be suitably selected and used by any person having ordinary skill in the art ('person skilled in the art'), to which the present invention pertains, therefore, a detailed description thereof will be omitted.

Under different conditions, the color sealant composition with self-sealing performance for a tire according to the present invention was studied and, as a result, it is considered that the color sealant composition with self-sealing performance for a tire is preferably provided under the aforementioned conditions, thereby achieving purposes of the present invention.

The present invention may provide a tire including the color sealant composition with self-sealing performance for a tire, as described above.

The tire may include the color sealant composition provided inside an inner liner of the tire.

The tire may be any one selected from passenger car tires, truck tires, bus tires, tires for special vehicles, aircraft tires and motorcycle tires.

Hereinafter, preferred embodiments will be described to more concretely understand the present invention with reference to examples and comparative examples. However, those skilled in the art will appreciate that such embodiments are provided for illustrative purposes and do not limit subject matters to be protected as disclosed in the detailed description and appended claims. Therefore, it will be apparent to those skilled in the art that various alterations and modifications of the embodiments are possible within the scope and spirit of the present invention and duly included within the range as defined by the appended claims.

EXAMPLES

Comparative Example 1

To 100 wt. parts of butyl rubber, 50 wt. parts of carbon black (N330) with an iodine adsorption number of 95±5 g/kg, 20 wt. parts of aromatic hydrocarbon resin (40MS, Struktol) as a homogenizer, 5 wt. parts of phenolic resin (KORESIN, BASF) as an adhesive, 0.5 wt. parts of N-(1, 3-dimethylbutyl)-N'-phenyl-p-phenylenediamine (Kumanox-13, Kumho Petrochemical Co.) as an anti-aging agent, and 20 wt. parts of process oil were added and mixed together, followed by primary combination at 130° C. for 1 hour to prepare a master batch.

3 wt. parts of red pigment (Red 2B220, Daihan Swiss Chemical Corp.), 70 wt. parts of polybutene having a number average molecular weight of 1,300 (PB1300, Daelim Industrial Co. Ltd.) and 140 wt. parts of polybutene having a number average molecular weight of 2,400 (PB2400, Daelim Industrial Co. Ltd.) were added to the master batch and the mixture was agitated at 70 rpm for 1.5 hours. Thereafter, 7 wt. parts of dicumyl peroxide (DCP) at a purity of 40% was added, followed by combination at 120° C. for 30 minutes, thereby preparing a sealant composition.

Table 1 below shows constitutional compositions of the prepared sealant composition.

Comparative Example 2

To 100 wt. parts of butyl rubber, 50 wt. parts of silica having a BET surface area of 115 m$^2$/g (Z115Gr grade), 20 wt. parts of aromatic hydrocarbon resin (40MS, Struktol) as a homogenizer, 5 wt. parts of phenolic resin (KORESIN, BASF) as an adhesive, 0.5 wt. parts of N-(1,3-dimethylbutyl)-N'-phenyl-p-phenylenediamine (Kumanox-13, Kumho Petrochemical Co.) as an anti-aging agent, and 20 wt. parts of process oil were added and mixed together, followed by primary combination at 130° C. for 1 hour to prepare a master batch.

3 wt. parts of red pigment (Red 2B220, Daihan Swiss Chemical Corp.), 70 wt. parts of polybutene having a number average molecular weight of 1,300 (PB1300, Daelim Industrial Co. Ltd.) and 140 wt. parts of polybutene having a number average molecular weight of 2,400 (PB2400, Daelim Industrial Co. Ltd.) were added to the master batch and the mixture was agitated at 70 rpm for 1.5 hours. Thereafter, 7 wt. parts of dicumyl peroxide (DCP) at a purity of 40% was added, followed by combination at 120° C. for 30 minutes, thereby preparing a sealant composition.

Table 1 below shows constitutional compositions of the prepared sealant composition.

Example 1

To 100 wt. parts of butyl rubber, 50 wt. parts of surface modified silica, 20 wt. parts of aromatic hydrocarbon resin (40MS, Struktol) as a homogenizer, 5 wt. parts of phenolic resin (KORESIN, BASF) as an adhesive, 0.5 wt. parts of N-(1,3-dimethylbutyl)-N'-phenyl-p-phenylenediamine (Kumanox-13, Kumho Petrochemical Co.) as an anti-aging agent, and 20 wt. parts of process oil were added and mixed together, followed by primary combination at 130° C. for 1 hour to prepare a master batch.

3 wt. parts of red pigment (Red 2B220, Daihan Swiss Chemical Corp.), 70 wt. parts of polybutene having a number average molecular weight of 1,300 (PB1300, Daelim Industrial Co. Ltd.) and 140 wt. parts of polybutene having a number average molecular weight of 2,400 (PB2400, Daelim Industrial Co. Ltd.) were added to the master batch and the mixture was agitated at 70 rpm for 1.5 hours. Thereafter, 7 wt. parts of dicumyl peroxide (DCP) at a purity of 40% was added, followed by combination at 120° C. for 30 minutes, thereby preparing a sealant composition.

The surface modified silica used herein may be prepared by placing silica having a BET surface area of 115 m$^2$/g (Z115Gr grade) in an oven at 400° C. and leaving it for 1.5 hours as it is, to be oxidized.

Table 1 below shows constitutional compositions of the prepared sealant composition

Example 2

To 100 wt. parts of butyl rubber, 50 wt. parts of surface modified silica, 20 wt. parts of aromatic hydrocarbon resin (40MS, Struktol) as a homogenizer, 5 wt. parts of phenolic resin (KORESIN, BASF) as an adhesive, 0.5 wt. parts of N-(1,3-dimethylbutyl)-N'-phenyl-p-phenylenediamine (Kumanox-13, Kumho Petrochemical Co.) as an anti-aging agent, and 20 wt. parts of process oil were added and mixed together, followed by primary combination at 130° C. for 1 hour to prepare a master batch.

3 wt. parts of yellow pigment (Yellow D541, Daihan Swiss Chemical Corp.), 70 wt. parts of polybutene having a number average molecular weight of 1,300 (PB1300, Daelim Industrial Co. Ltd.) and 140 wt. parts of polybutene having a number average molecular weight of 2,400 (PB2400, Daelim Industrial Co. Ltd.) were added to the master batch and the mixture was agitated at 70 rpm for 1.5 hours. Thereafter, 7 wt. parts of dicumyl peroxide (DCP) at a purity of 40% was added, followed by combination at 120° C. for 30 minutes, thereby preparing a sealant composition.

The surface modified silica used herein may be prepared by adding silica having a BET surface area of 115 m²/g (Z115Gr grade) to a 3M concentration nitric acid solution at 115° C., reacting the same for 5 hours, washing and drying the reaction product at 100° C.

Table 1 below shows constitutional compositions of the prepared sealant composition.

Example 3

To 100 wt. parts of butyl rubber, 50 wt. parts of surface modified silica, 20 wt. parts of aromatic hydrocarbon resin (40MS, Struktol) as a homogenizer, 5 wt. parts of phenolic resin (KORESIN, BASF) as an adhesive, 0.5 wt. parts of N-(1,3-dimethylbutyl)-N'-phenyl-p-phenylenediamine (Kumanox-13, Kumho Petrochemical Co.) as an anti-aging agent, and 20 wt. parts of process oil were added and mixed together, followed by primary combination at 130° C. for 1 hour to prepare a master batch.

3 wt. parts of blue pigment (Blue 8700, Daihan Swiss Chemical Corp.), 70 wt. parts of polybutene having a number average molecular weight of 1,300 (PB1300, Daelim Industrial Co. Ltd.) and 140 wt. parts of polybutene having a number average molecular weight of 2,400 (PB2400, Daelim Industrial Co. Ltd.) were added to the master batch and the mixture was agitated at 70 rpm for 1.5 hours. Thereafter, 7 wt. parts of dicumyl peroxide (DCP) at a purity of 40% was added, followed by combination at 120° C. for 30 minutes, thereby preparing a sealant composition.

The surface modified silica used herein may be prepared by placing silica having a BET surface area of 115 m²/g (Z115Gr grade) in an oven at 400° C. and leaving it for 1.5 hours as it is, to be oxidized.

Table 1 below shows constitutional compositions of the prepared sealant composition.

TABLE 1

Constitutional compositions of sealant compositions prepared in Comparative Examples 1 to 2 and Examples 1 to 3 (unit: parts by weight)

| Items | Comparative Example 1 | Comparative Example 2 | Example 1 | Example 2 | Example 3 |
|---|---|---|---|---|---|
| Butyl rubber | 100 | 100 | 100 | 100 | 100 |
| Carbon black | 50 | — | — | — | — |
| Silica | — | 50 | 50 | 50 | 50 |
| Pigment | 3 | 3 | 3 | 3 | 3 |
| Homogenizer | 20 | 20 | 20 | 20 | 20 |
| Adhesive | 5 | 5 | 5 | 5 | 5 |
| Anti-aging agent | 0.5 | 0.5 | 0.5 | 0.5 | 0.5 |
| Process oil | 20 | 20 | 20 | 20 | 20 |
| Polybutene* | 70 | 70 | 70 | 70 | 70 |
| Polybutene ** | 140 | 140 | 140 | 140 | 140 |
| Peroxide | 7 | 7 | 7 | 7 | 7 |

*Polybutene having a number average molecular weight of 1300 (PB1300, Daelim Industrial Co. Ltd.)
** Polybutene having a number average molecular weight of 2400 (PB2400, Daelim Industrial Co. Ltd.)

Experimental Example

With regard to the sealant compositions prepared in Examples 1 to 3 and Comparative Examples 1 and 2, respectively, sealing performance and extent of color expression were measured and results of the measurements are shown in Table 2 below.

The sealing performance was determined and evaluated by applying each of the prepared sealant compositions inside an inner liner of a tire, inserting nails at 8 sites in a circumferential direction of a tread and punching holes on the tread part of the tire, and measuring a change in pneumatic pressure after running 300 km.

Extent of color expression was determined by observing whether or not a color of the sealant composition is expressed on the tire at a site where the nail was removed in the circumferential direction of the tread.

TABLE 2

Results of sealing performance and color expression of compositions prepared in Comparative Examples 1 and 2 and Examples 1 to 3

| Items | Comparative Example 1 | Comparative Example 2 | Example 1 | Example 2 | Example 3 |
|---|---|---|---|---|---|
| Sealing performance[1] | 8/8 | 2/8 | 8/8 | 8/8 | 8/8 |
| Color expression [2] | x | x | ○ | ○ | ○ |

[1] Sealing performance is indicated by numerical values for "sealing achieved/nail removed sites"
[2] Results of observing by naked eyes as to whether or not a color of the sealant composition can be distinguished from the tire at nail removed sites (x: no color distinction, ○: color distinction)

As understood from the results of Table 2, with regard to sealing performance after occurrence of holes in the tire tread, it can be seen that, when each of the sealant compositions prepared in Comparative Example 1 and Examples 1 to 3, except for the sealant composition prepared in Comparative Example 2 wherein the surface modified silica was not used, was applied to a tire and the sealing performance was evaluated, 300 km running was successfully completed without a change in pneumatic pressure even though the tread part in the tire was pierced by inserting nails at 8 sites in the circumferential direction.

Meanwhile, as a result of comparing between the sealant composition prepared in Comparative Example 1 and the sealant composition prepared in Example 1 in order to evaluate color expression, it was found that the sealant composition of Comparative Example 1 had a high contamination of carbon black as a constitutional component of the composition, and did not express the color of red pigment. Further, as a result of comparing between the sealant composition prepared using typical silica in Comparative Example 2 and the sealant composition prepared using surface modified silica in Example 2 in order to evaluate color expression, it was found that, when the surface modified silica, prepared by oxidizing the typical silica at a high temperature, was used as a reinforcing agent, the color of red pigment could be expressed. This means that the sealant composition can be easily observed from the tire including the sealant composition since the color of pigment has been expressed even in the sealant compositions prepared using the surface modified silica in Examples 1 and 3, respectively.

As mentioned above, the color sealant composition with self-sealing performance useful for tires of the present invention is characterized in that a color sealant with different colors from a tire outflows due to pneumatic pressure when a hole is made in the tire (that is, the tire becomes flat), to exert self-sealing effects and thus prevent the pneumatic pressure in a tire ('tire pressure') from being decreased and retain a desired level. Furthermore, since the sealant with different colors from the tire is provided on the tire, it is possible to ensure that a consumer will see the need to replace the tire, thereby providing assistance in safe running.

According to the present invention, tire manufacturers may provide improved tires with excellent safety to consumers and the consumers may also more safely drive cars. Consequently, the present invention is advantageous to both of the manufacturers and the consumers and contributes to tire-related industrial development, thereby accomplishing industrial applicability.

CONCLUSION

All of the various embodiments or options described herein can be combined in any and all variations. While the invention has been particularly shown and described with reference to some embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A color sealant composition for a tire, comprising:
   to 100 wt. parts of raw rubber,
   10 to 60 wt. parts of surface modified silica prepared by placing silica at 300 to 500° C. for 30 minutes to 3 hours,
   0.05 to 5 wt. parts of pigment,
   40 to 100 wt. parts of polybutene having a number average molecular weight of 1,000 to 1,500,
   60 to 300 wt. parts of polybutene having a number average molecular weight of 2,000 to 3,000, and
   5 to 15 wt. parts of peroxide, so as to have self-sealing performance.

2. The composition according to claim 1, wherein the raw rubber is at least one selected from natural rubber and butyl rubber.

3. A tire comprising the color sealant composition for a tire according to claim 1.

4. A tire comprising the color sealant composition for a tire according to claim 1, wherein the composition is applied inside an inner liner of the tire.

* * * * *